July 9, 1963 C. A. MOORE 3,097,265

SIMPLIFIED COMMUNICATION SYSTEM

Filed April 22, 1960 2 Sheets-Sheet 1

INVENTOR.
CHARLES A. MOORE
BY
Owen & Owen

INVENTOR.
CHARLES A. MOORE
BY
Owen & Owen 3,097,265
Patented July 9, 1963

3,097,265

SIMPLIFIED COMMUNICATION SYSTEM

Charles A. Moore, Elmhurst, Ill., assignor to Eprad, Inc., Toledo, Ohio, a corporation of Ohio Filed Apr. 22, 1960, Ser. No. 24,010
7 Claims. (Cl. 179—1)

This invention relates to a simplified communication system which is particularly suited for smaller drive-in restaurants and establishments of a similar nature in which it is desired to establish communication between one of a plurality of remote stations and a central station.

Numerous types of communication circuits are known in the art for a multitude of applications. The present invention provides a communication system which is greatly simplified and employs relatively inexpensive components and, consequently, is low in cost so as to be suitable for installations where costs would otherwise be prohibitive. For example, the new communication system is practical for smaller drive-in restaurants and for frozen confection businesses where costs, both initial and maintenance, of known communication or ordering systems are so high as to eliminate such businesses from the potential market. While the communication system according to the invention, as described below, is illustrated in connection with drive-in restaurants or the like, it is to be understood that the system is suitable for many other applications, such as hospitals, offices, and ships.

It is, therefore, a principal object of the invention to provide an improved, low cost communication system.

Another object of the invention is to provide a communication system which is greatly simplified and more reliable than those known in the art.

Other objects and advantages of the invention will be apparent from the following detailed description of a preferred embodiment thereof, reference being made to the accompanying drawings, in which.

Figures 1, 2:
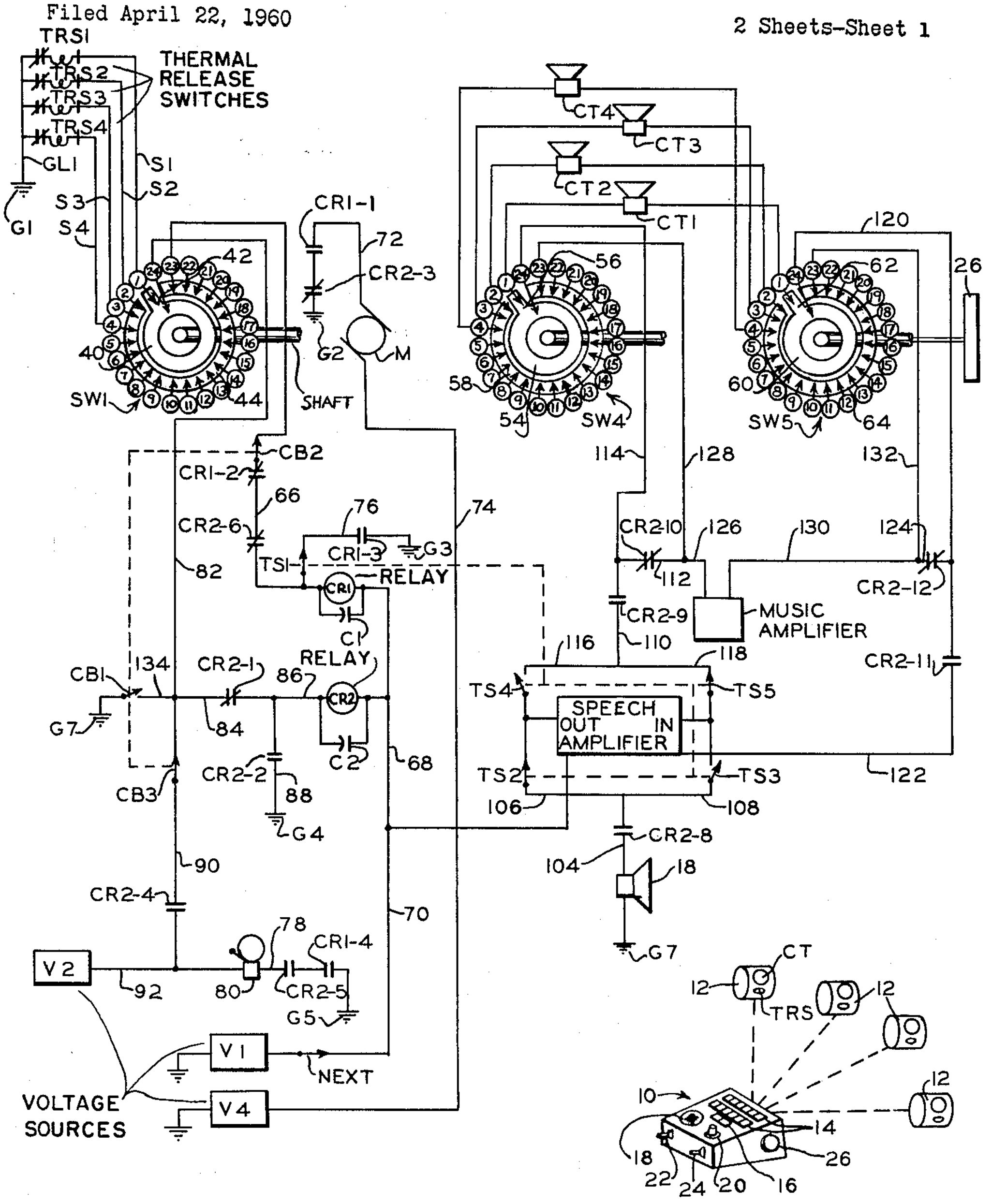
FIG. 1 is a somewhat schematic view in perspective of a switchboard and a plurality of transducer housings which constitute the basic components of a communication system according to the invention.
FIGS. 2 and 2A are diagrammatic views of a communication circuit embodying the principles of the invention.

Referring to the drawings, and more particularly to FIG. 1, most of the elements of a simplified communications system according to the invention are contained in a switchboard designated 10 which is located at a central unit or station with which communication is to be made from a plurality of remote stations. At each of the remote stations is a transducer housing 12 containing an electro-acoustic transducer designated CT and a thermal release switch designated TRS. The switchboard 10 includes ten translucent squares 14 which carry digits representing the units digits of the various remote stations, each of which is designated by a predetermined number. Additional translucent squares 16 carry numbers representing the tens digits of the remote stations. Lamps are located beneath the squares to light the square or squares indicating the number of the station with which the switchboard 10 is connected.

The switchboard 10 also includes a central electro-acoustic transducer 18 which receives sound from and transmits it to the remote stations, the sound being regulated by a volume control 20. A talk switch 22 enables the transducer 18 to act as a microphone and the customer's transducer CT to act as a speaker to enable a message to be carried from the switchboard 10 to a remote station. Another lever switch 24 has a lower position to which the switch is moved in order to cancel a connection between the central station and one of the remote stations and render the system ready for connection between the central station and another remote station. The switch 24 also has an upper position which enables one of the remote stations to be called back from the central switchboard 10. The particular station to be called is selected by turning a knob 26 on the side of the switchboard 10 which is rotated until the number of the desired station appears on the translucent squares 14 and 16.

Substantially the entire communication system is located in the switchboard 10 and the transducer housings 12. Except for the external connecting wiring, about the only other external components are the voltage supplies and a program or music amplifier and its related parts which can be optionally employed to supply music to the remote transducers.

Describing the operation of the communication system briefly with respect to a drive-in restaurant, a customer, after driving into a station on the drive-in parking lot and after determining his order, initiates operation of the system by pressing the thermal release switch TRS. This actuates a signal, preferably in the form a buzzer in the central switchboard 10, which notifies an operator or order-taker thereat that a customer wishes to place an order. The order-taker then presses the talk switch 22, after noting the number of the station calling in on the translucent squares 14 and 16, and asks the customer for the order. The customer thereupon gives his order after the order-taker has released the talk switch 22 and when the transaction is completed, the switch 24 is pushed downwardly to disconnect the remote station having just called in and to ready the system for another call. If the order-taker wishes to call back a station to check on an order or tell a customer that the drive-in is out of a particular item, for example, he presses the switch 24 upwardly and rotates the knob 26 until the number of the desired station appears on the squares 14 and 16. The order-taker can then talk with the customer at that station simply by pressing the talk switch 22. If desired, a program amplifier or music amplifier, with related components, can be employed in the system to supply music or paging facilities at the customers' transducers not in use, that is, not connected to the central switchboard 10.

Figure 2A:
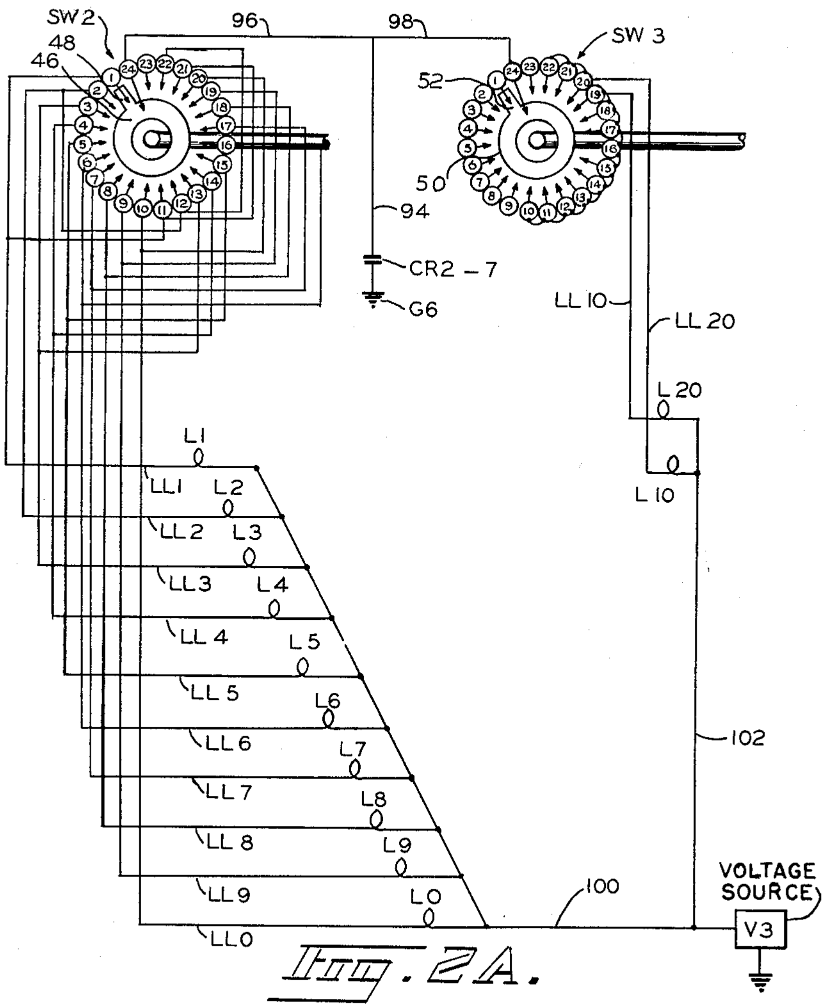

FIGS. 2 and 2*a* illustrate a circuit employed in the simplified communication system. The circuit includes five switch wafers designated SW1, SW2, SW3, SW4, and SW5 which are mounted on a common shaft and driven by a motor M. All of the switch wafers are fastened in fixed relationship on the shaft so that when the switch wafer SW1 is in contact with a station at which the switch TRS is closed, the other wafers are in corresponding positions. The switch wafer SW1 seeks out a remote station at which the thermal switch TRS is closed, by operating the motor M until this switch is connected into the circuit. The switch wafers SW2 and SW3 light the corresponding lamp or lamps designated L0–L9 and L10, L20 (FIG. 2A) which are located beneath the squares 14 and 16 (FIG. 1) to show on the switchboard 10 the number of the station with which connection is made. Further, the switch wafers SW4 and SW5 connect the corresponding customer's transducer CT into the circuit in connection with the central transducer 18. In addition to the switch wafers and the station number lamps, the system basically includes the central speaker 18, a speech amplifier, so labeled in FIG. 2, and two relays CR1 and CR2.

Each of the switch wafers SW1—SW5 has 24 lugs, the first 22 of which are used for 22 remote stations and the last two of which make electrical contact with other portions of the circuit, except in the case of the wafers SW2 and SW3, each of which have but one lug for this purpose. Hence, the circuit as shown is capable of handling 22 stations which is entirely adequate for most small drive-in restaurants and frozen confection establishments. It is to be understood, however, that more stations can be employed simply by using switch wafers with a larger number of lugs or, with slight modification, employing an increased number of switch wafers.

Only four customer transducers CT1—CT4 are shown and only the corresponding four thermal release switches TRS1—TRS4 are shown for clarity of illustration.

Figure 3:
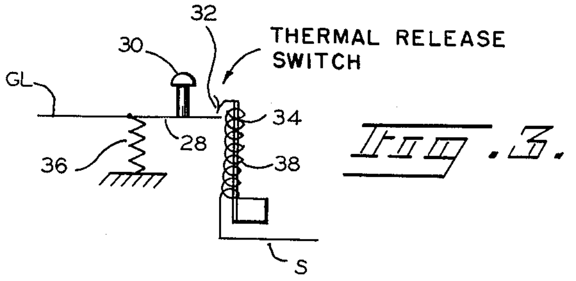
FIG. 3 is a schematic view of a thermal release switch employed with transducers constituting part of the new communication system.

One of the thermal release switches is shown in detail in FIG. 3 and includes a contact lever 28 connected to a button 30 which, when depressed, is held in contact with a hook 32 of a bi-metallic strip 34 by means of a spring 36. Engagement of the hook 32 and the contact lever 28 completes a circuit from a station line S through a coil 38 to a ground line GL, thereby connecting the line S to ground. When a heavier current is supplied through the line S by a higher voltage, the coil 38 heats and causes the bi-metallic strip 34 to bend, thereby moving the hook 32 away from the contact lever 28 and enabling the spring 36 to move the lever 28 upwardly out of engagement with the hook 32.

Referring now in more detail to the construction and operation of the switch wafers, the switch wafer SW1 (FIG. 2) includes an inner ring 40 from which extends a movable contact or tang 42 and an outer, arcuate ring 44, both of which rings and movable contact rotate together on the shaft. A lug 23 of the switch wafer SW1 is connected to a voltage source V1 which is connected through the outer, arcuate ring 44 to all of the stations except that with which the movable contact 42 is in contact. A lug 24 of the wafer SW1 is connected to the source V1 and also to another source of voltage V2, and is in electrical contact through the inner ring 40 and the movable contact 42 with the remaining station, corresponding to the lug with which the movable contact 42 is in contact.

The units lamp switch wafer SW2 (FIG. 2A) includes only a ring 46 and a movable contact or tang 48 which rotate to place lug 24 in contact with a lug connected to one of lamp lines LL1—LL0. Lines LL1 and LL2 are connected to lugs 1 and 2 and are also jumpered to lugs 11 and 12 and lugs 21 and 22, respectively. This causes the light L1 or L2 to light when any of the corresponding lugs 1, 11 and 21 or 2, 12 and 22 are contacted by the movable contact 48. Similarly, the lamps L3—L0 are each connected to two lugs 3 and 13, 4 and 14, etc., so as to light when the movable contact 48 contacts either of them.

The tens digit switch wafer SW3 includes a ring 50 and a movable contact or tang 52. The lug 24 is in contact with the ring 50 and is electrically connected to one of the lugs 1—22 with which the movable contact 52 is in contact. The lamp L10 is connected through a line LL10 to the lug 19 and is jumpered to the lugs 10—18 while the lamp L20 is connected through a line LL20 to the lug 20 and is jumpered to the lugs 21 and 22. Thus, the lamp L10 lights for all stations 10—19 and the lamp L20 lights for stations 20—22.

The first transducer switch wafer SW4 (FIG. 2) includes an inner ring 54 with a movable contact or tang 56 and an outer, arcuate ring 58. The outer ring 58 connects a music or program amplifier, if one is employed, through the lug 23 to all of the customer transducers CT except that with which the movable contact 56 is in contact. The movable contact 56 connects the remaining transducer CT through a lug 24 to a speech amplifier.

The second transducer switch wafer SW5 includes an inner ring 60 with a movable contact or tang 62 and an outer, arcuate ring 64. The outer ring 64 connects all of the customer transducers CT, except the one with which the movable contact 62 is in contact, through a lug 23 to the ground side of the music amplifier. The movable contact 62 connects the remaining customer transducer through a lug 24 to the ground side of the speech amplifier. The transducer switch wafer SW5 thus serves to separate the grounds for the music amplifier and the speech amplifier, which eliminates a slight noise in the customer transducers occurring when a common ground is employed. Where this is not deemed objectionable, the switch wafer SW5 can be eliminated and a common ground used for all customer transducers.

In the following description, the prefix "NC" before the word "contacts" designates relay contacts which are closed when their relay is unactuated and "NO" designates relay contacts which are open when their relay is unactuated.

*Operation*

Suppose a customer now comes into the first station, No. 1, and, desiring to order, presses the thermal release switch TRS1 (FIG. 2). Assuming that the switch wafers SW1—SW5 have been positioned at another station, say station 5, with which communication had previously been made, the outer, arcuate ring 44 of the selector switch wafer SW1 will make an electrical connection between the lugs 1 and 23 and a circuit will now be completed from the voltage source V1 through a first power path, constituting lines 66, 68 and 70, to the station line S1 and the ground line GL1. Completion of this circuit pulls in a start relay CR1 which closes its NO contacts CR1–1 in a line 72 connecting the motor M to a ground G2. A circuit thereby is completed from a source of voltage V4 through a line 74, the motor M, and the line 72 to the ground G2.

The start relay CR1 also opens NC contacts CR1–2 in the line 66 to block any additional calls from operating the start relay and the motor when communication is being made with the first station. At the same time, a third set of NO contacts CR1–3 in a line 76 connect the start relay CR1 to a ground G3 to hold it in. A capacitor C1, which was charged when the start relay CR1 was initially actuated, discharges across the relay CR1 to hold it in during the instant when the contacts CR1–2 are opening and the contacts CR1–3 are closing. In addition, a set of NO contacts CR1–4 of the start relay CR1 in a line 78 close to ready a signal or buzzer 80 for operation.

Operation of the motor M rotates the five switch wafers SW1—SW5 in a common direction until the movable contact 42 of the switch wafer SW1 contacts the lug corresponding to the station at which the temperature release switch TRS1 is closed. A circuit is then completed through the inner ring 40 and the lug 24 and through lines 82, 84, 86, 68, and 70 to the voltage source V1 to pull in a stop relay CR2.

The relay CR2 opens a pair of NC contacts CR2–1 in the line 84 and at the same time closes a pair of NO contacts CR2–2 in a line 88 to hold in the relay CR2 by connecting it to a ground G4. These contacts make the operation of the relay CR2 independent of the wafer SW1. A capacitor C2, charged when the relay CR2 was initially actuated, then discharges during the instant that the contacts CR2–1 are opening and the contacts CR2–2 are closing. Contacts CR2–3 of the stop relay CR2 in the line 72 are also opened when the relay CR2 is actuated to break the circuit through the motor M and cause it to stop. The wafers SW1—SW5 then stop with the movable contacts in contact with the lugs for the first station.

A fourth set of NO contacts CR2–4 in a line 90 are closed by the stop relay CR2 to complete a circuit through a line 90 and a line 92 to the voltage source V2 to supply heavier power to the thermal release switch TRS1, causing its coil 38 to heat and bend the strip 34 outwardly to open the switch. This is accomplished in a period of about two or three seconds. During this time, the contacts CR2–1 prevent the heavier current from the voltage source V2 from damaging the stop relay CR2. A fifth set of NO contacts CR2–5 of the stop relay CR2 close to complete a circuit for the buzzer 80 from the voltage V2 through the lines 92 and 78 and the contacts CR1–4 and CR2–5 to a ground G5. Operation of the buzzer, located in the switchboard 10 signals the operator or order-taker that a customer at a station is ready to give an order. A sixth set of NC contacts CR2–6 in the line 66 are opened to block other calls, even when the start relay CR1 is dropped out and the contacts CR1–2 are closed.

The lamps indicating the number of the station calling in are also lighted by actuation of the stop relay CR2 which closes NO contacts CR2–7 (FIG. 2A) in a line 94 which connects the lamp switch wafers SW2 and SW3 to a ground G6 through lines 96 and 98. This ground is imposed on the rings 46 and 50 by the lugs 24. A circuit is then completed from the source of voltage V3 through a line 100, one of the lines LL1—LL0, the lug of the switch wafer SW2 with which the movable contact 48 is in contact, and, hence, to the ground G6. This lights the appropriate lamp L1—L0. At the same time, a circuit is completed through a line 102, one of the lines LL10 or LL20, one of the lugs 10—22 of the switch wafer SW3, if the movable contact 52 is in contact with one of them, and, hence, to the ground G6. With the movable contacts 48 and 52 in contact with the first lugs of the wafers SW2 and SW3, as shown in FIG. 2A, the lamp L1 will be lighted indicating that the first station is calling in an order. The order-taker then notes the station number on the order blank before actually taking the order.

With the buzzer 80 ringing and the number of the station calling in having been noted, the order-taker then presses the talk switch 22 and asks for the order. NO contacts CR2–8 in a line 104 already have been closed by the relay CR2 to ready the central transducer 18 for operation, the transducer 18 previously having been cut out of the circuit by the contacts CR2–8 to eliminate background noise therein. The talk switch has five sets of manually operated contacts designated TS1—TS5 in FIG. 2. The contacts TS1 in the line 76 are opened when the talk switch is depressed to disconnect the relay CR1 from the ground G3 and open it, dropping out this relay and opening contacts CR1–4 to shut off the buzzer 80. The open contacts CR2–6 block further operation of the relay CR1 and the open contacts CR2–3 in the line 72 prevent operation of the motor M. The contacts TS2 in a line 106 are also opened to disconnect the transducer 18 from the output of the speech amplifier and at the same time, contacts TS3 in a line 108 are closed to connect the transducer 18 to the input of the speech amplifier.

NO contacts CR2–9 in a line 110 have been closed and NC contacts CR2–10 in a line 112 have been opened when the relay CR2 pulled in to connect a line 114 to the speech amplifier and disconnect it from the music amplifier. The line 114 is connected through the lug 24 of the first transducer switch wafer SW4 and through the ring 54 and the movable contact 56 to one of the customer transducers corresponding to the lug with which the movable contact 54 is in contact. That particular customer transducer, in this case CT1, is then shut off from the music and is connected to the speech amplifier by operation of the stop relay contacts CR2–9 and CR2–10.

Contacts TS4 of the talk switch are also closed with depression of the talk switch lever 22 to connect the line 110 and, hence, the transducer CT1 to the output of the speech amplifier through a line 116 and contacts TS5 of the talk switch are opened to disconnect the line 110 and the transducer CT1 from the input of the speech amplifier through a line 118. Thus, it will be seen that the four sets of talk switch contacts TS2—TS5 enable the central transducer 18 to now act as a microphone by being connected to the input of the speech amplifier and also enable the customer transducer CT1 to act as a speaker by being connected to the output of the speech amplifier.

A circuit is completed through the customer transducer, in this case CT1, which is connected to the speech amplifier, by the wafer SW5 and a line 120 which connects the transducer CT1 to a ground of the speech amplifier through the movable contact 62, the inner ring 60 and the lug 24. NO contacts CR2–11 in a line 122 are now closed to complete the ground circuit to the speech amplifier for the transducer CT1, and at the same time, NC contacts CR2–12 of the stop relay are opened in a line 124 to disconnect the transducer CT1 from the ground of the music amplifier. The circuit is thus completed through the transducer CT1 to the speech amplifier and the order-taker asks for the order. The talk switch is then released with the contacts TS1—TS5 reverting to their original positions to enable the customer transducer CT1 to now act as a microphone and the central transducer 18 to act as a speaker, thereby enabling the customer to give his order. In this state, the customer transducer is connected through the inner ring 54 and the lug 24 of the switch wafer SW4 and the lines 114, 110 and 118 to the input of the speech amplifier and the central transducer 18 is connected through the line 104 and the line 106 to the output of the speech amplifier.

During the communication between the central transducer 18 and the customer transducer, the remaining customer transducers, except the one having the lug in contact with the movable contacts 56 and 62 of the wafers SW4 and SW5, are connected to the music amplifier, on one side through a line 126, 128, the lug 23 of the wafer SW4, the outer, arcuate ring 58, the lugs except the one with which the movable contact 56 is in contact and the customer transducer lines CT. The other side of the customer transducers are connected to the music amplifier through a line 130, a line 132, the lug 23 of the wafer SW5, the outer arcuate ring 64, and the other lugs, except the one with which the movable contact 62 is in contact, and, hence, through the customer transducer lines CT to these transducers.

Upon completion of the order, the lever 24 on the switchboard 10 (FIG. 1) is depressed to open a manually operated switch labelled "next" (FIG. 2) in the line 70. This drops out the stop relay CR2 and also the relay CR1, if not previously dropped out, extinguishing the station indicator lamp and changing the stop relay contacts CR2–9 to CR2–12 to their normal positions to again establish music to the remaining station with which communication has just been completed. The circuit is now back to its dormant state and ready for the next customer call. If another customer has closed his thermal release switch while the order from the first station was being taken, then the start relay CR1 will be pulled back in immediately through the outer, arcuate ring 44 of the wafer SW1 and the lug 23 to again start the motor M and cause the wafers to scan the station lugs until another station having a closed thermal release switch is contacted, again causing the stop relay CR2 to be pulled in and the motor M to be stopped, thus setting up the wafers for another order-taking cycle.

If the order-taker desires to again contact or call back a station with which communication had previously been made, the switch lever 24 is raised to its upward position which closes its contacts CB1 in a line 134 which pulls in the stop relay CR2 by connecting it to a ground G7 to complete a circuit from the voltage source V1 through the lines 70, 68, 86, 84, and 134 to this ground. At the same time, a second set of contacts CB2 in the line 66 are opened to block any other calls which may be made by the closing of the thermal release switches at the customer stations, and thus prevent undesired operation of the start relay CR1. Finally, contacts CB3 in the line 90 are opened to prevent current from the voltage source V2 from being supplied to the switch wafer SW1 and, hence, to any of the thermal release switches while the switch wafers SW1—SW5 are being rotated. This prevents the possibility that closed switches TRS might be accidentally opened. Rotation of the switch wafers in this instance is accomplished by the knob 26 which is manually rotated until the station number of the station to be called appears on the switchboard through lighting of the station indicator lamps. The lamps are lighted as the knob 26 is rotated because the stop relay contacts CR2–7 in the line 94 are now closed. When the desired station is reached by rotation of the knob 26, as indicated by the lighted station indicator lamp or lamps, the talk switch 22 is pressed to establish communication from the transducer 18 to the appropriate customer transducer.

To summarize the over-all operation, when a thermal release switch at a customer's station is closed, a circuit is completed through the start relay CR1, unless the switch which is closed was the one with which previous communication had been made, and the motor M then rotates the switch wafers SW1—SW5 to a position at which the movable contact 42 is in contact with the closed switch, at which time the stop relay CR2 is pulled in to stop the motor M, to enable the appropriate station indicator lamp or lamps to be lighted, to actuate the signal 80, and to connect the central transducer and the customer transducer at the station whose switch is closed to the speech amplifier. The talk switch is then depressed to connect the central transducer 18 as a microphone and the customer transducer as a speaker to enable the order-taker to talk to the customer at the remote customer station. The "next" switch is then opened to drop out the stop relay CR2 and again place the system in a dormant position. For call back, the lever 24 is raised to pull in the stop relay CR2 and ready the system for communication with the customer station which is selected by rotation of the knob 26.

Various modifications of the above described preferred embodiment of the invention will be apparent to those skilled in the art and it is to be understood that such modifications can be made without departing from the scope of the invention, if within the spirit and tenor of the accompanying claims.

I claim:

1. In a communication system for establishing communication between a central station and one of a plurality of remote stations, each remote station having a switch capable of manual closing and remote opening by means spaced from the switch, each of said remote stations also having an electro-acoustic transducer, a first switch wafer electrically connected individually to a plurality of said remote station switches, a first relay electrically connected to said wafer switch and being actuated when any station switch but the one at which said switch wafer is set is closed, a motor for driving said switch wafer, circuit means connecting said motor to a source of power, said first relay having normally open contacts in said circuit means which are closed when said first relay is actuated to start said motor, a second relay electrically connected to said switch wafer and actuated when said switch is rotated to a position in electrical contact with a station having a closed switch, said second relay having first normally closed contacts in said motor circuit means which are opened when said second relay is actuated to stop said motor, a second source of power, second circuit means electrically connecting said second source of power to said first switch wafer, said second relay having second normally opened contacts in said second circuit means, said second contacts of said second relay being closed when said second relay is actuated to supply current to the closed station switch to open said closed switch, a second wafer switch connected to said motor conductor means electrically connecting said second wafer switch to said electro-acoustic transducer at the station at which the switch is closed, a central electro-acoustic transducer electrically connected to said second wafer switch, and means for completing a circuit through a transducer of a station having a closed switch.

2. A system for selecting a closed switch from a plurality of remotely located switches, said system comprising a plurality of remotely located switches, each of which includes means for being opened when subjected to a predetermined current, a first power path, a second power path, a motor, a source of power for said motor, conductor means connecting said motor and said power source, connecting means rotated by said motor and having means for connecting all of said switches except one to said first power path and means for connecting the remaining switch to the second power path, the remaining switch being changed as said connecting means is rotated, a first relay in said first power path actuated when any switch except the remaining switch is closed to complete a circuit through said first power path, said first relay having normally open contacts in said conductor means, said contacts being closed when said relay is actuated to start said motor and to rotate said connecting means to change the switch which constitutes the remaining switch, a second relay in said second power path actuated when the remaining switch is closed to complete a circuit through said second power path, said second relay having normally closed contacts in said conductor means which are opened to stop said motor when said second relay is actuated, a second power source, second conductor means connecting said second power source to said second power path, said second relay having normally open contacts in said second conductor means which are closed when said second relay is actuated to supply said predetermined current from said second power source through said second conductor means, said second power path, and said connecting means to the closed switch in order to open same.

3. A communication system for establishing communication between one of a plurality of remote transducers and a central transducer, said system comprising a plurality of remote transducers, a central transducer, a plurality of remote switches, each of which is associated with a remote transducer, a first power path, a second power path, a motor, a source of power for said motor, conductor means connecting said power source and said motor, first connecting means rotated by said motor and having means for connecting all of said switches except one to said first power path and means for connecting the remaining switch to said second power path, the remaining switch being changed as said connecting means is rotated, a first relay in said first power path actuated when any switch except said remaining switch is closed to complete a circuit through said first power path, said first relay having normally open contacts in said conductor means, said contacts being closed when said relay is actuated to start said motor and to rotate said connecting means to change the switch which constitutes the remaining swich, a second relay in said second power path actuated when the remaining switch is closed to complete a circuit through said second power path and operate said second relay, said second relay having normally closed contacts in said conductor means opened when said second relay is actuated to stop said motor, a speech amplifier having an input and an output, second connecting means connecting the remote transducer associated with the closed switch to said speech amplifier, means for connecting said central transducer to said amplifier, a manually-operated talk switch having a plurality of contacts operated thereby for connecting said central transducer to the input and said remote transducer to the output of said speech amplifier when said talk switch is depressed, said talk switch contacts operating to connect said central transducer to the output and said remote transducer to the input of said speech amplifier when said talk switch is released.

4. A system according to claim 3 and means including means rotated by said motor for indicating which station constitutes the remaining station when said motor is stopped.

5. A system for selecting a closed switch from a plurality of remotely located switches, said system comprising a plurality of remotely located switches, a first power path, a second power path, a motor, a source of power for said motor, conductor means connecting said motor and said power source, connecting means rotated by said motor and having means for connecting all of said switches except one to said first power path and means for connecting the remaining switch to the second power path, the remaining switch being changed as said connecting means is rotated, a first relay in said first power path actuated when any switch except the remaining switch is closed to complete a circuit through said first power path, said first relay having normally open contacts in said conductor means, said contacts being closed when said relay is actuated to start said motor and to rotate said connecting means to change the switch which constitutes the remaining switch, a second relay in said second power path actuated when the remaining switch is closed to complete a circuit through said power path, said second relay having normally closed contacts in said conductor means opened when said second relay is actuated to stop said motor, an electrically operated signal, a second power source for said signal, second conductor means connecting said second power source and said signal, said first relay having normally open contacts in said second conductor means which are closed when said first relay is actuated, and said second relay having normally open contacts in said second conductor means which are closed when said second relay is actuated, whereby said signal is operated when the second contacts of said first and second relays are closed.

6. A communication system for establishing communications between one of a plurality of remote transducers and a central transducer, said system comprising a plurality of remote transducers, a central transducer, a plurality of remote switches, each of which is associated with a remote transducer, a first power path, a second power path, rotatable connecting means having means for connecting all of said switches except one to said first power path and means for connecting the remaining switch to said second power path, the remaining switch being changed as said connecting means is rotated, means for rotating said rotatable connecting means, first means in said first power path for operating said rotating means when any switch except said remaining switch is closed to complete a circuit through said first power path, second means in second power path for stopping said rotating means when the remaining switch is closed, an amplifier having an input and an output, second connecting means connecting the remote transducer associated with the closed switch to said amplifier, means for connecting said central transducer to said amplifier, manually-operated switch means for connecting said central transducer to the input and said remote transducer to the output of said amplifier, and for connecting said central transducer to the output and said remote transducer to the input of said amplifier, a signal, means for operating said signal when said remaining switch is closed and is connected to said second power path, and means including means rotated by said motor for indicating which station constitutes the remaining station.

7. A system according to claim 6 and manually-operated means for rotating said first and second changing means for connecting said central transducer to a desired remote transducer through said second connecting means to enable communication to be made between said central transducer and said desired remote transducer.

References Cited in the file of this patent

UNITED STATES PATENTS

| | | |
|---|---|---|
| 2,529,069 | Berstern | Nov. 7, 1950 |
| 2,688,657 | Wilson | Sept. 7, 1954 |